United States Patent [19]
Morishita et al.

[11] Patent Number: 5,150,421
[45] Date of Patent: Sep. 22, 1992

[54] SYSTEM FOR AUTOMATED TRANSFORMATION OF GRAY LEVEL OF IMAGE

[75] Inventors: Koichi Morishita, Kawasaki; Tetsuo Yokoyama, Tokyo; Kazuhiro Sato, Ibaraki, all of Japan

[73] Assignees: Hitachi, Ltd.; Hitachi Medical Corporation, both of Tokyo, Japan

[21] Appl. No.: 639,221

[22] Filed: Jan. 9, 1991

[30] Foreign Application Priority Data

Jan. 9, 1990 [JP] Japan .................................. 2-002100

[51] Int. Cl.⁵ .............................................. G06K 9/36
[52] U.S. Cl. ........................................... 382/6; 382/51
[58] Field of Search .......................... 382/51, 6, 18

[56] References Cited

U.S. PATENT DOCUMENTS 4,792,979 12/1988 Nomura et al. .................... 382/51

OTHER PUBLICATIONS

A. Rosenfeld et al. "Digital Picture Processing" Academic Press, 1976, pp. 172–177.

Primary Examiner—Leo H. Boudreau
Attorney, Agent, or Firm—Antonelli, Terry Stout & Kraus

[57] ABSTRACT

Disclosed is an automated image gray level transformation system applied to a medical image processing work station for the purpose of dispensing with the prior art manual complex processing thereby improving the accuracy of diagnosis. The system carries out, in addition to its fundamental step of equalizing a histogram of image data of an input image, the steps of suppressing an adverse effect of a background region of the image so as to obtaining an intensity transformation function, constraining the intensity transformation function and modifying a bias value used for the function constraining.

12 Claims, 8 Drawing Sheets

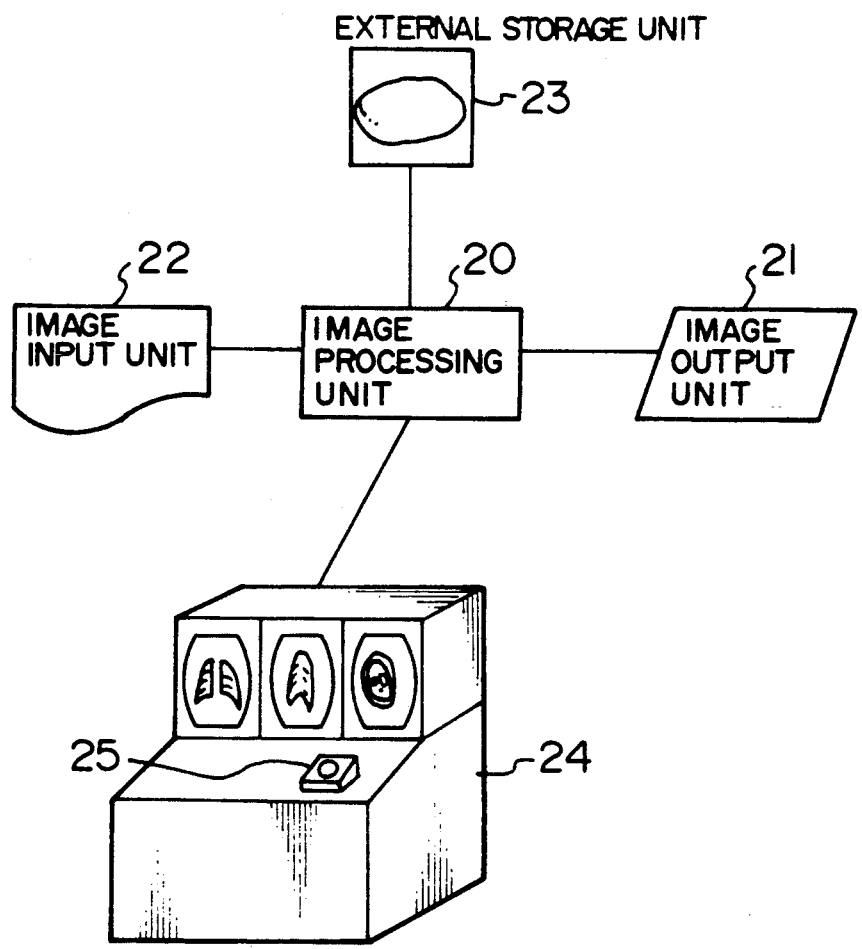
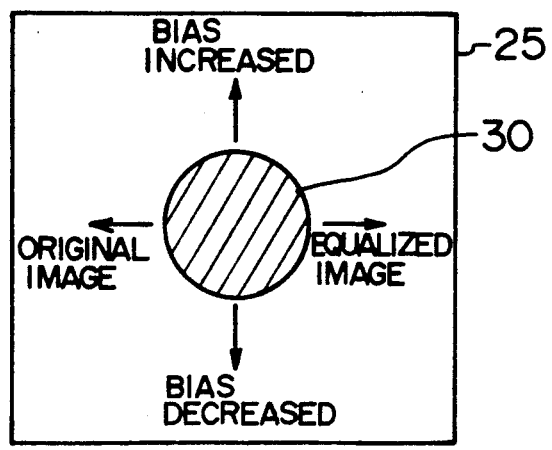

FIG. 5
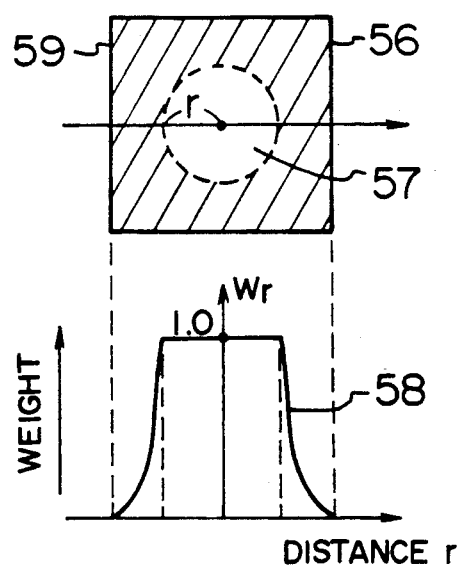
FIG. 6A
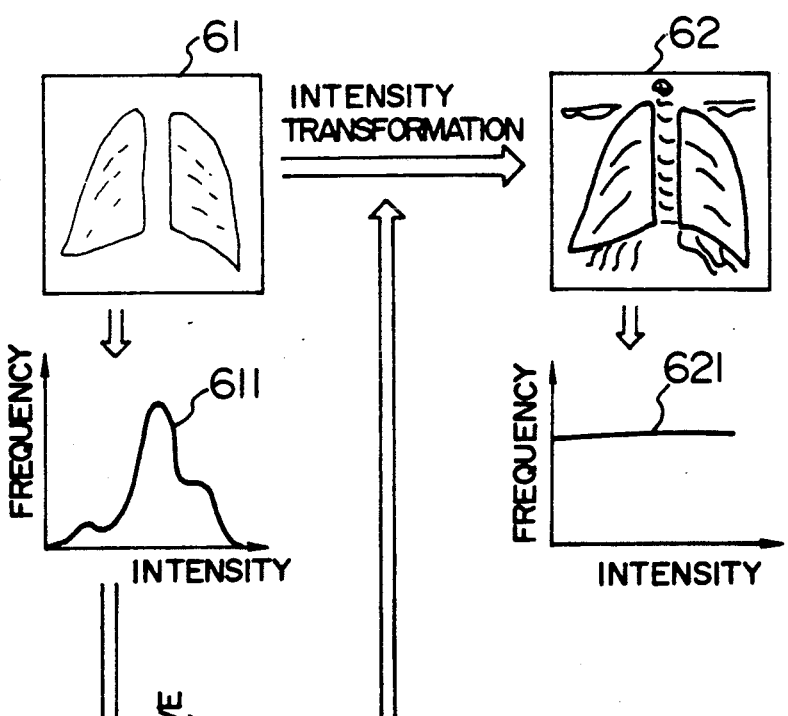
FIG. 6B
FIG. 6C
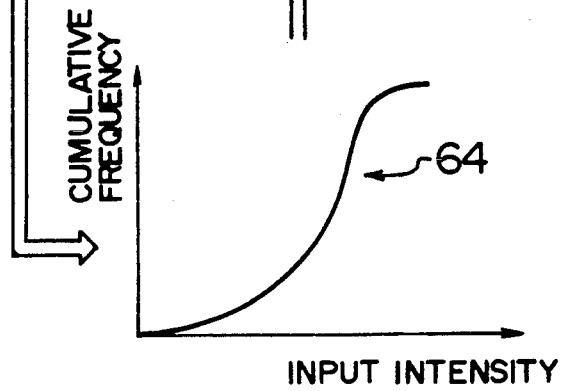

SYSTEM FOR AUTOMATED TRANSFORMATION OF GRAY LEVEL OF IMAGE

BACKGROUND OF THE INVENTION

This invention relates to an automated gray level transformation system for use in an image processing work station where a plurality of digital images are displayed for the purpose of comparative observation, and more particularly to an automated gray level transformation system in which the contrast of an objective image can be automatically changed.

As an example of a prior art method for automated gray level transformation, a method for histogram flattening or equalization transformation is described in a book entitled "Digital Picture Processing" pp. 172-177, written by A. Rosenfeld and A. C. Kak and published in 1976 by Academic Press.

According to this histogram equalization transformation method, a picture's histogram is transformed so that all of the intensity values appear with the same frequency. Thus, the amount of information in the picture can be maximized.

When an image is processed according to this histogram equalization transformation method, the contrast in a region including intensity occurring with a high frequency is improved, while, on the other hand, the contrast in a region including intensity occurring with a low frequency is lowered.

The prior art method described above has been effective only when an objective image and an image display system satisfy the following conditions:

(1) A background region (a meaningless region other than the objective region) does not substantially exist in the image.

(2) The frequency of intensity in the objective region of the image does not have a small value over a wide range.

(3) The frequency of intensity in the objective region of the image does not have an extreme Peak.

(4) The image display system has a linear input/output characteristic throughout its operating range.

The prior art method has had the problem that the desired result of image processing cannot be achieved when the objective image and the image display system do not satisfy the conditions (1) to (4) described above. More precisely, in the case of imaging for the medical diagnostic purpose, such as X-rays imaging or MRI (magnetic resonance imaging), the conditions (1) to (3) are hardly satisfied, and, in the case of CRT or like image display, the condition (4) is difficult to be satisfied due to the unsatisfactory image displaying characteristic especially in a low intensity portion.

Therefore, when the prior art method is directly applied to the imaging for the medical diagnostic purpose, a contrast shortage appears in the objective region in the case of the condition (1), because the background region occupies a wide intensity range. Also, in the case of the condition (2), the objective region has a narrowed intensity range, and a contrast shortage occurs in the objective region.

Also, in the case of the condition (3), the intensity range in the objective region is unnecessarily greatly widened, and an artifact due to an overemphasis and generation of noise are given rise to.

Further, in the case of the condition (4), the intensity in low intensity portions tends to be depressed, and the observability for dark portions tends to be lowered in conjunction with the visibility of the human visual system.

SUMMARY OF THE INVENTION

With a view to solve all of such prior art problems, it is an object of the present invention to provide an automated gray level transformation system in which the contrast of an objective image can be automatically modified.

The automated gray level transformation system according to the present invention which attains the above object is featured by the following steps of processing (I) to (III):

(I) Optimization of contrast

A line having a arbitrary selected gradient is provided to represent a reference intensity transformation function, and the intensity difference between the line and an intensity transformation function obtained by histogram equilization processing is constrained so as to continuously suppress the gradient of the intensity transformation function obtained by the histogram equalization processing.

(II) Minimization of adverse effect of image background

At the time of histogram computation, pixel elements are weighted by a weight corresponding to the distance from the marginal edges or corresponding to intensity values. In another method, the boundary between the objective region and the background regions (the contour of the objective region) is detected, and the histogram limited to the interior of the objective region is computed.

(III) Biasing modification

In order to prevent depression of the intensity of low intensity portions, a bias value corresponding to the output intensity is added to the intensity transformation function obtained in (I).

In the contrast optimization processing step (I), a medium characteristic intermediate between the reference characteristic and the equalized characteristic is computed to provide the intensity transformation function representing the relation between the input intensity and the output intensity so as to suppress both the contrast shortage and the overemphasis which are problems in the equalized characteristic. Thus, the contrast shortage in the high frequency regions and the overemphasis in the low frequency regions can be suppressed in the resultant histogram.

The background regions commonly exist adjacent to the marginal edges of the image, and the intensity in those background regions is extremely low or high in many cases. Therefore, the background suppressing processing step (II) is executed so as to suppress the adverse effect of the background regions of the image. This processing step (II) includes the following methods (a) to (c):

(a) Method using a weight corresponding to the distance

In this method, the weight is selected to be small in the marginal edge part where the background regions of the objective image exist, while the weight is selected to be large in the central part where the objective region exists, and this manner of weighting addition of the weighted products is used for the computation of the frequency during preparation of the histogram. Thus, the adverse effect of the background regions can be suppressed.

(b) Method using a weight corresponding to the intensity value

Because the intensity the background regions of the image is extremely low or high in many cases, a weight corresponding to the intensity value is selected, and the manner of weighting addition similar to that described in (a) is used for the computation of the frequency. This weight is selected to decrease as the intensity approaches the minimum intensity $f_{min}$ or maximum intensity $f_{max}$ of the image.

(c) Method resorting to contour detection

In this method, the contour of the objective region of the image is extracted to separate the objective region from the background regions, and the histogram computation is limited to the objective region so as to suppress the adverse effect of the background regions.

Further, in the biasing modification step (III), a large bias value is added to the intensity of lower intensity portions thereby suppressing the depression of the lower intensity portions attributable to the input/output characteristic of the image display system and also attributable to the visibility of the human visual system, so that the observability of the image can be improved.

By the combination of these processing steps (I) to (III), the contrast of the objective image can be automatically modified into that suitable for observation.

BRIEF DESCRIPTION OF THE DRAWINGS

FIG. 2 is a perspective view of an image diagnostic system to which the automated gray level transformation system of the present invention is applied.

FIG. 3 illustrates the function of the track ball shown in FIG. 2.

FIGS. 4A, 4B and 5 illustrate the manner of background suppression processing in the first embodiment of the Present invention.

FIGS. 6A, 6B and 6C illustrate the manner of histogram equalization in the first embodiment of the present invention.

DESCRIPTION OF THE PREFERRED EMBODIMENTS

Preferred embodiments of the present invention will now be described in detail with reference to the drawings.

(First Embodiment)

Figure 1:
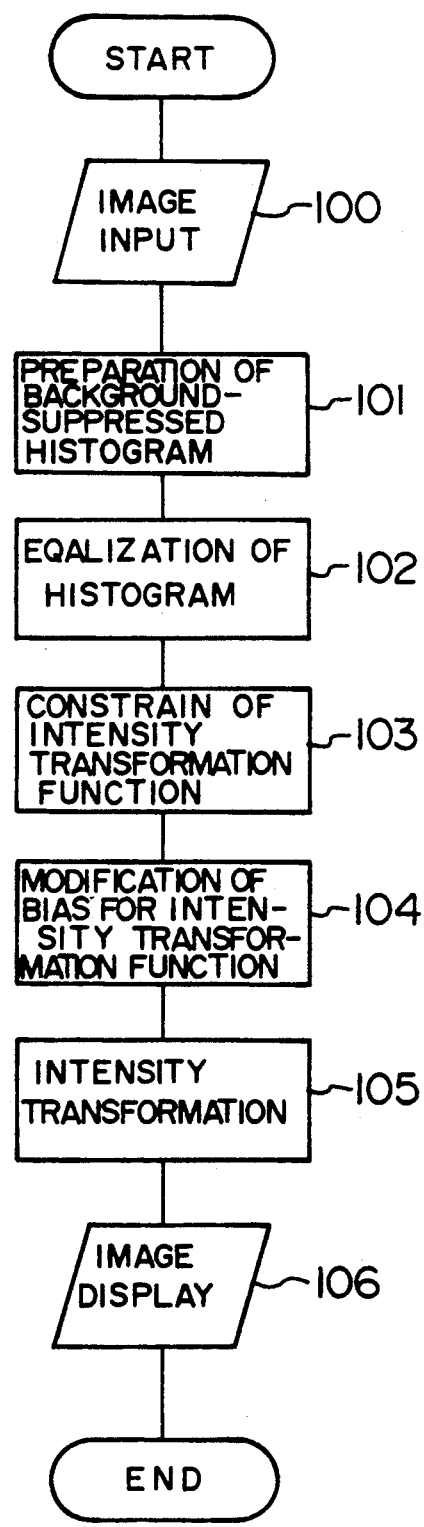
FIG. 1 is a flow chart showing the sequence of processing in a first embodiment of the automated gray level transformation system according to the present invention.

FIG. 1 is a flow chart showing the sequence of processing in a first embodiment of the automated gray level transformation system according to the present invention.

FIG. 2 shows the arrangement of an image diagnostic system to which the automated gray level transformation system of the present invention is applied, and FIG. 3 illustrates the function of the track ball shown in FIG. 2. For simplicity of illustration, the following description will be directed to the case of medical image diagnosis, especially, that using a medical image processing work station displaying such an image on a CRT for the purpose of diagnosis by a doctor.

Referring to FIG. 2, the medical image processing work station includes an image processor unit 20, an image input unit 21, an image output unit 22 for printing out a hard copy of an image, an external storage unit 23 for storing images, an image display unit 24, and a track ball 25.

In FIG. 3, the reference numeral 30 designates the ball of the track ball 25.

In the work station to which the first embodiment of the present invention is applied, the doctor making diagnosis observes images obtained by various imaging apparatuses such as an X-rays imaging apparatus, an X-rays CT imaging apparatus and an MRI (magnetic resonance imaging) apparatus and displayed on the image display unit 24. The doctor continues his interactive diagnosis on the images while manipulating the man-machine interface such as the track ball 25 thereby optimazing the contrast of each input image.

In the flow chart shown in FIG. 1, an image input step 100 is followed by a step 101 in which a histogram of the image is prepared while suppressing the adverse effect of background regions outside the objective image region, and the step 101 is followed by a step 102 in which the histogram is flattened or equalized so as to obtain an intensity transformation function.

Then, in a step 103, the intensity transformation function obtained in the step 102 is constrained, and in a step 104, biasing modification processing is made on the constrained intensity transformation function. Then, in a step 105, the image is subjected to the intensity transformation so as to improve the visual observability of the image, and the resultant image is finally displayed on the image display unit 24 in a step 106.

The processing steps of the flow chart will now be described in detail.

First, the step 101 of preparation of the image's histogram while suppressing the adverse effect of the background regions will be described.

Figure 4A:
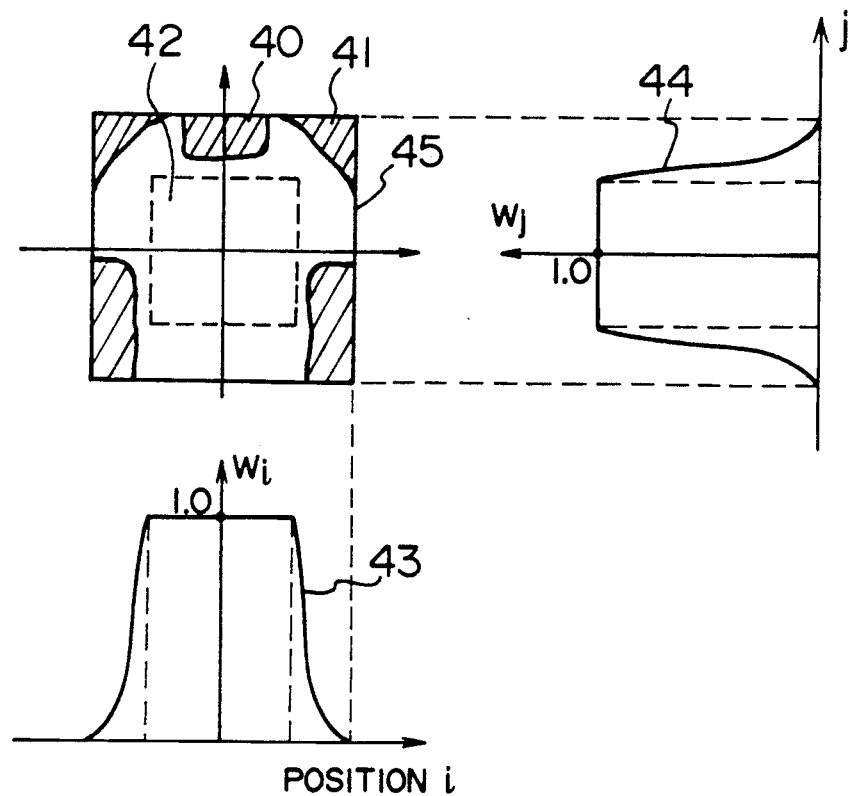

In FIG. 4A, an input image generally designated by the reference numeral 45 includes background regions 40, 41 and a square objective region 42. The reference numerals 43 and 44 designate a lateral or horizontal weight function dependent on the position of the input image 45 and a longitudinal or vertical weight function dependent also on the position of the input image 45, respectively.

Suppose, for example, that the input image 45, the lateral weight function dependent on the position of the input image 45 and the longitudinal weight function dependent also on the position of the input image 45 are expressed as $f_{ij}$, $W_i$ and $W_j$ respectively. Then, the weight $W_{ij}$ corresponding to an image element position (i, j) is given by $$W_{ij} = \min(W_i, W_j)$$

Figure 4B:
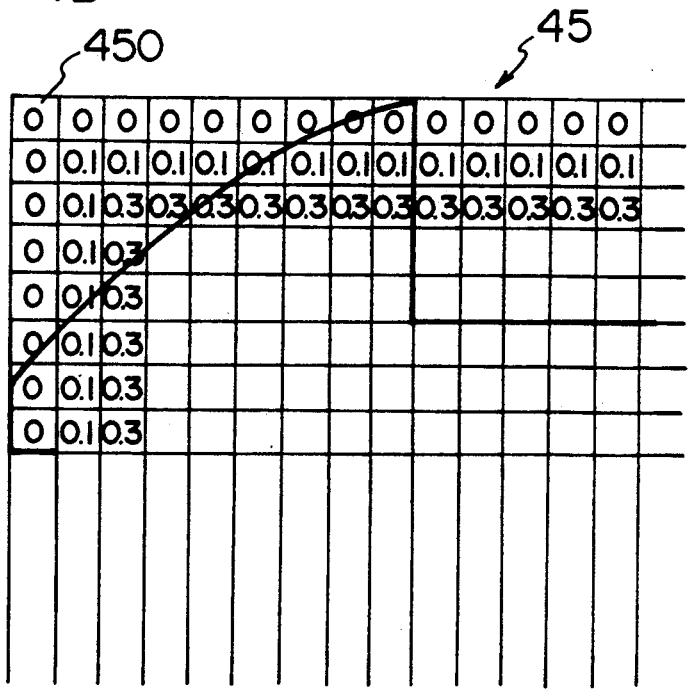

FIG. 4B shows an enlarged view of the input image 45, and the weight $W_{ij}$ corresponding to the image element position (i, j) is allotted to each of the individual image elements 450.

The weight functions $W_i$ and $W_j$ are functions in which i and j are variables respectively. Commonly these functions are practically such that both sides of the curve are in the form of quadratic functions, and the central part represents a constant value.

Therefore, when the frequency of appearance of each intensity level is expressed as $P_g$, the histogram in which the weight $W_{ij}$ is taken into account is given by $$P_g = \sum_{ij} \delta_g(f_{ij}) \cdot W_{ij}$$

$$(g = 1, 2, \ldots)$$

where $\delta_g(f_{ij})$ is a variable which is equal to 1 when $f_{ij} = g$ but equal to 0 when $f_{ij} \neq g$.

In FIG. 5, an input image 59 includes a background region 56 and a circular objective region 57. The reference numeral 58 designates a weight function dependent on the position of the input image 59.

Suppose, for example, that the objective region 57 is enclosed in a circular frame as shown. Then, the weight Wr at the position of an image element is a function of the distance r from the center of the circle. Therefore, the weight Wr corresponding to an image element position (i, j) is given by a function of
$$r = (i^2 + j^2)^{\frac{1}{2}}$$

The histogram is computed as in the case of FIG.

Thus, by employing the weight Wr dependent on the distance from the center of the objective region 57, the adverse effect of the background region 56 outside the frame of the objective region 57 can be suppressed in the histogram.

The histogram equalization step 102 in the flow chart of FIG. 1 will now be described. This histogram equalization processing is such that, as shown in FIGS. 6A, 6B and 6C, the intensity is transformed for each image element of an input image 61 so as to obtain a Processed image 62 where the histogram has a fixed value 621. In this case, it is known that the intensity transformation function used for the equalization is given in the form of a cumulative histogram 64 of the input image 61.

In the illustrated embodiment, on the basis of the histogram obtained in the background suppression step 101 in the flow chart of FIG. 1, the cumulative histogram $P_g$ is computed according to $$Pg = \Sigma/tg \, Pg \, (g = 1, 2, \ldots),$$

and the intensity transformation characteristic is computed for the purpose of the histogram equalization.

The intensity transformation characteristic constraining step 103 in the flow chart of FIG. 1 will now be described.

Figure 7A:
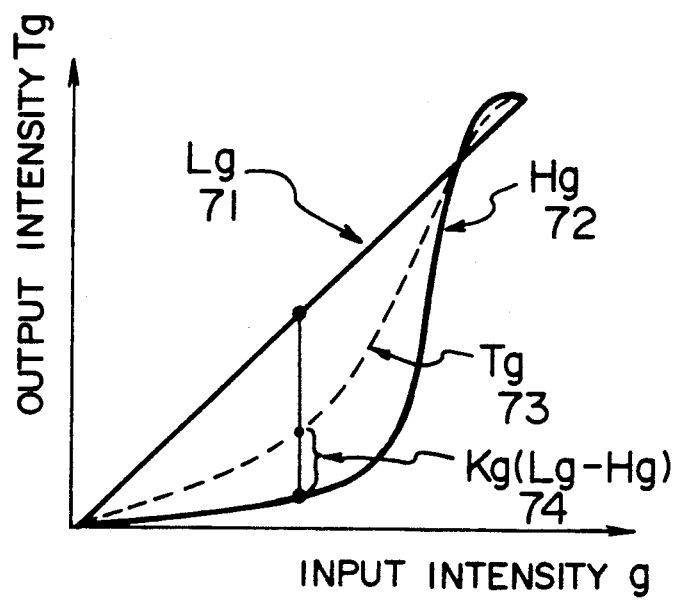
FIGS. 7A and 7B illustrate the manner of intensity transformation in the first embodiment of the present invention.
Figure 7B:
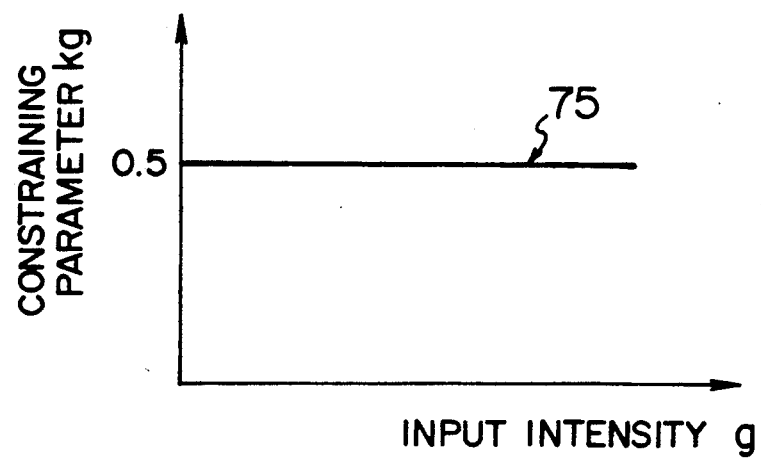

FIGS. 7A and 7B illustrate the intensity transformation characteristic obtained in the first embodiment of the present invention.

In FIGS. 7A and 7B, the reference numerals 71, 72, 73, 74 and 75 designate a reference intensity transformation characteristic curve Lg, an intensity transformation characteristic curve Hg obtained after the histogram equalization in the histogram equalization processing step 102, an intensity transformation characteristic curve Tg obtained after the constraining step 103, the intensity difference (Lg−Hg) between the reference characteristic curve Lg 71 and the equalized characteristic curve Hg 72, and a constraining parameter, respectively.

The description will be directed to the case where the reference characteristic curve Lg 71 is in the form of a line having an inclination of 45°, that is, the case where an input intensity coincides with an output intensity. In this case, the constraining processing is attained by limiting the intensity difference (Lg−Hg) 74 between the reference characteristic curve Lg 71 and the equalized characteristic curve Hg 72. For this purpose, the constraining parameter Kg 75 is introduced. The value of this constraining parameter Kg ranges from 0 to 1.0. When the value of the constraining parameter Kg is Kg=1.0, the intensity transformation characteristic curve coincides with the reference characteristic curve Lg 71, while when Kg=0, the intensity transformation characteristic curve coincides with the equalized characteristic curve Hg 72.

Therefore, after the constraining step 103, the intensity characteristic (the output luminance) Tg is given by $$\begin{aligned} Tg &= Hg + Kg(Lg - Hg) \\ &= (1 - Kg)Hg + KgLg \end{aligned}$$

Thus, when the constraining parameter Kg 75 is maintained constant as shown in FIG. 7B and is not dependent on the input intensity g, the output intensity curve Tg 73 is expressed as the linear combination of the equalized characteristic curve Hg 72 and the reference characteristic curve Lg 71.

The value of the constraining parameter Kg is previously determined according to the imaging apparatus or the body part to be diagnosed or modified in an interactive mode as described later.

Figure 8A:
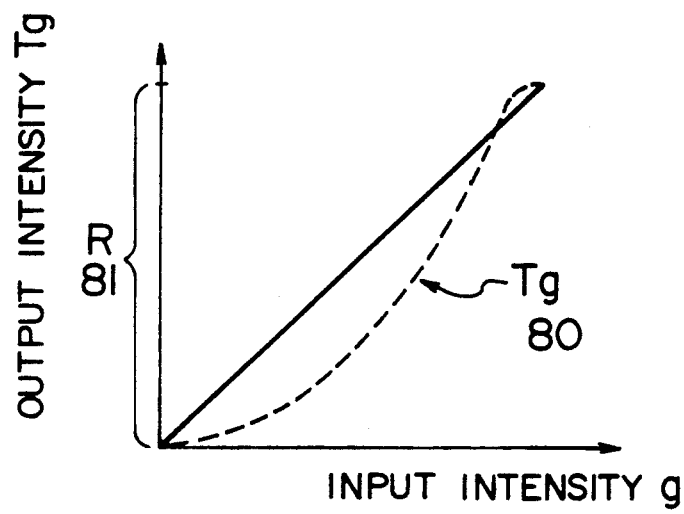
FIGS. 8A and 8B illustrate the manner of biasing modification in the first embodiment of the present invention.
Figure 8B:
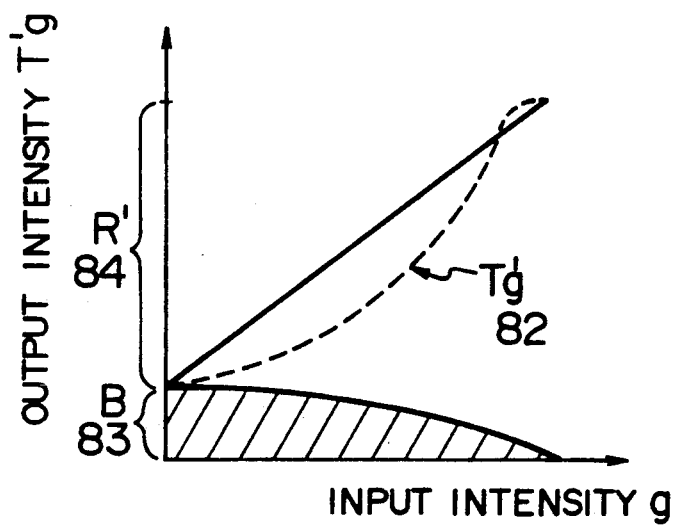

FIGS. 8A and 8B illustrate the biasing modification step 104 in the flow chart shown in FIG. 1.

FIG. 8A shows the relation between the input intensity and the output intensity before the biasing modification, and FIG. 8B shows the same relation after the biasing modification. The reference numerals 80, 81, 82, 83 and 84 designate an output intensity characteristic curve Tg before the biasing modification, an intensity range R of the output intensity Tg before the biasing modification, an output intensity characteristic curve Tg' after the biasing modification, a bias value B used for the biasing modification, and an intensity range R' of the output intensity Tg' after the biasing modification, respectively.

In the illustrated embodiment, the curve Tg 80 represents the intensity characteristic obtained in the intensity transformation function constraining step 103 in the flow chart shown in FIG. 1.

The intensity transformation characteristic Tg' obtained after the biasing modification is given by $$Tg' = [(R-B)/R] \cdot Tg + B$$

Transformation of the above equation provides the following equation:

$$Tg' = Tg + \frac{B}{R}(R - Tg)$$

Thus, the intensity transformation characteristic Tg' obtained after the biasing modification is the sum of Tg and the bias value which is provided by the second term in the right-hand member of the above equation. The value of this second term changes depending on the value of Tg. That is, the second term takes its maximum bias value B when Tg=0 and is equal to 0 when Tg=R. Because Tg represents the output intensity before the biasing modification, the bias value is large in low intensity portions of the image and becomes smaller with the increase in the intensity.

When the value of Tg obtained after the intensity transformation function constraining step 103 is substituted in the above equation before being transformed, the following equation is obtained:

$$Tg' = [(R-B)/R] \cdot [(1-Kg)Hg + KgLg] + B$$

Therefore, both the intensity transformation function constraining step 103 and the biasing modification step 104 can be simultaneously executed according to this equation.

Finally, the above value of Tg' is used to execute the step 105 of intensity transformation for all the image elements so as to provide the final processed image in the step 106.

The constraining parameter Kg and the bias value B are used as parameters in the steps of processing described above. These processing parameters can be set by moving the ball 30 of the track ball 25 shown in FIG. 3. In such a case, the constraining parameter Kg is set in interlocking relation by, for example, the horizontal movement of the ball 30, and the bias value B is set in interlocking relation by, for example, the vertical movement of the ball 30. Thus, the doctor can freely adjust the automatically processed image as desired, so that the accuracy of diagnosis can be improved. Such interactive processing can be similarly made by the use of, for example, a mouse in lieu of the track ball.

According to the illustrated embodiment, the histogram equalization of a image which is not substantially adversely affected by background regions can be achieved. Therefore, the prior art problems encountered with the step of histogram equalization, such as a lowered contrast in low intensity portions of an image and an overemphasis in high frequency portions of an image, can be substantially solved. Further, the problem of the observability of low intensity portions of an image, which is frequently encountered with imaging by a CRT display or the like can be improved to improve the accuracy of diagnosis.

Determination of processing parameters by a clinical demonstration will be required in future from the aspect of automation of the gray level transformation too. In this connection, both the constraining parameter and the bias value can be easily determined, and the desired automation of the gray level transformation can be generally achieved by setting default values.

SECOND EMBODIMENT

This second embodiment provides a substitute for the background suppressed histogram preparation step 101 executed in the first embodiment and intends to highly accurately suppress the adverse effect of image background regions. The second embodiment is generally similar to the first embodiment in the remaining processing steps and the structure of the system.

Figure 9A:
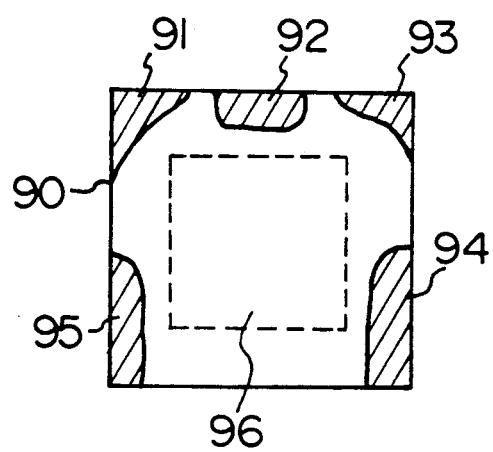
FIGS. 9A and 9B illustrate the manner of determination of a weighting function in a second embodiment of the present invention.
Figure 9B:
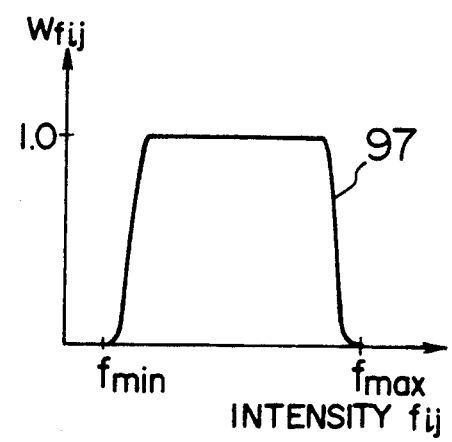

FIGS. 9A and 9B illustrate how the weight function is determined in the second embodiment.

FIG. 9A shows a input image 90 including background regions 91 to 95 and a square objective region 96, and FIG. 9B shows a weight function representing the weight applied to intensity values of individual image elements.

This second embodiment utilizes such empirical information that a low intensity portion and a high intensity portion have high possibility of including noise components peculiar to background regions, and the weight represented by the weight function 97 is determined on the basis of the intensity $f_{ij}$ of each image element. That is, the weight is selected so that it takes a small value at both a low intensity portion and a high intensity portion. The manner of determining the weight function 97 is similar to that described in the first embodiment.

Also, the weight function may be used in combination with the manner of background suppression described with reference to FIG. 4A in the first embodiment.

Thus, when the weight dependent on the image position is expressed as $W_{ij}$, and the weight dependent on the intensity is expressed as $W_{fij}$, the synthesized weight $W_T$ is set as follows:

$$W_T = \tfrac{1}{2}(W_{ij} + f_{ij}) \; [W_{ij} \neq 1.0]$$

$$W_T = W_{ij} \; [W_{ij} = 1.0]$$

In the manner described above, the processing for suppression of the adverse effect of background regions can be highly accurately carried out.

THIRD EMBODIMENT

This third embodiment provides a substitute for the background suppressed histogram preparation step 101 executed in the first embodiment and is especially effective for application to diagnosis of, for example, a tomographic image obtained by the MRI (magnetic resonance imaging). The third embodiment is also generally similar to the first embodiment in the remaining processing steps and the structure of the system.

Figure 10A:
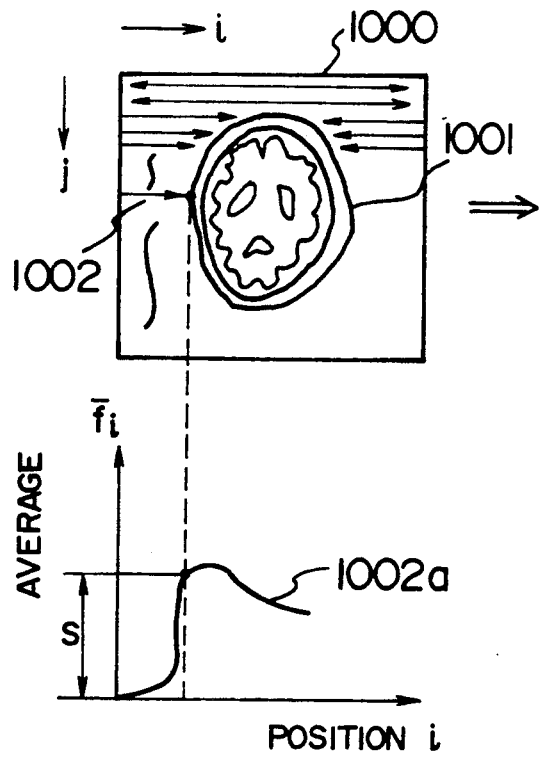
FIGS. 10A and 10B illustrate the manner of background suppression processing in a third embodiment of the present invention.
Figure 10B:
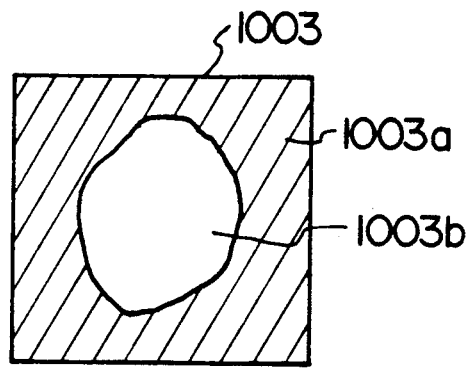

FIGS. 10A and 10B illustrate how the adverse effect of background regions is suppressed according to the third embodiment of the present invention.

FIG. 10A shows an input image 1000 including an objective region 1001, and the reference numeral 1002 designates a scanning line. FIG. 10B shows the image 1003 after contour detection. In FIG. 10B, the reference numerals 1002a, 1003a and 1003b designate the moving average value $\bar{f}$ of points scanned by the scanning line 1002, the background region and the objective region respectively.

In this third embodiment, the contour of the input image 1000 is extracted so as to directly separate the objective region 1003b from the background region 1003a. In this case, the input image 1000 is horizontally scanned from the left-hand and right-hand sides so as to detect an abrupt change in the intensity thereby extracting the contour of the input image 1000.

When, for example, five points are scanned by the scanning line 1002, the moving average $\bar{fi}$ is computed as follows:

$$\bar{fi} = \sum_{k=-2}^{2} fi + k/5$$

The moving average $\bar{fi}$ of the points scanned by the scanning line 1002 is used so as to suppress the adverse effect of noise thereby stabilizing the contour extraction.

Then, the difference between the value of $\bar{fi}$ and the average value $\bar{fo}$ of intensity at start points of scanning by the scanning line 1002 is detected, so that the contour is extracted when the above difference exceeds a predetermined threshold value S.

In lieu of computing the average of intensity values as described above, standard deviation may be used for the contour extraction.

FOURTH EMBODIMENT

This fourth embodiment provides a substitute for the intensity transformation characteristic constraining step 103 executed in the first embodiment. The fourth embodiment is generally similar to the first embodiment in the remaining processing steps and the structure of the system.

Figure 11:
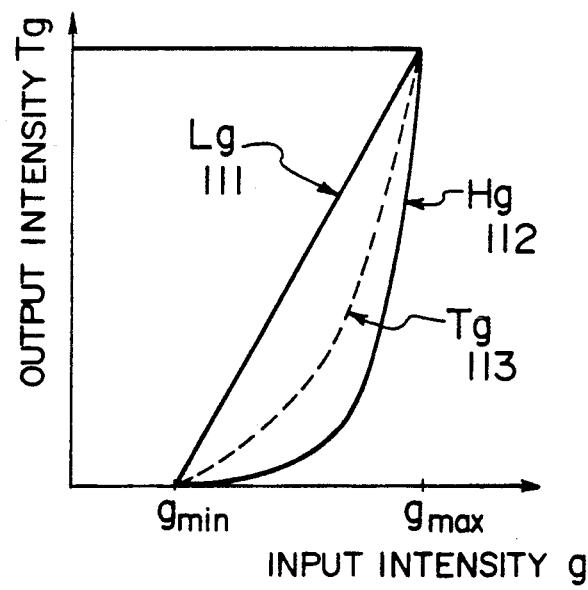
FIG. 11 illustrates how to constrain the intensity transformation characteristic in a fourth embodiment of the present invention.

FIG. 11 illustrates how the intensity transformation characteristic is constrained in the fourth embodiment of the present invention.

In FIG. 11, the reference numerals 111, 112 and 113 designate a reference characteristic curve Lg, an equalized characteristic curve Hg and a constrained characteristic curve Tg, respectively.

In this fourth embodiment, the intensity range of the reference characteristic Lg 111 is limited. Suppose, for example, that $g_{min}$ and $g_{max}$ represent the minimum and maximum intensity values respectively. Then, the reference characteristic Lg 111 is given by a line having a large inclination, and the constrained characteristic Tg 113 is given by a dotted curve as shown.

Thus, the reference characteristic Lg can be automatically set according to the minimum and maximum intensity values of an input image, and the intensity range can be effectively utilized.

FIFTH EMBODIMENT

This fifth embodiment provides a substitute for the intensity transformation characteristic constraining step 103 executed in the first embodiment. The fifth embodiment is generally similar to the first embodiment in the remaining processing steps and the structure of the system.

Figure 12A:
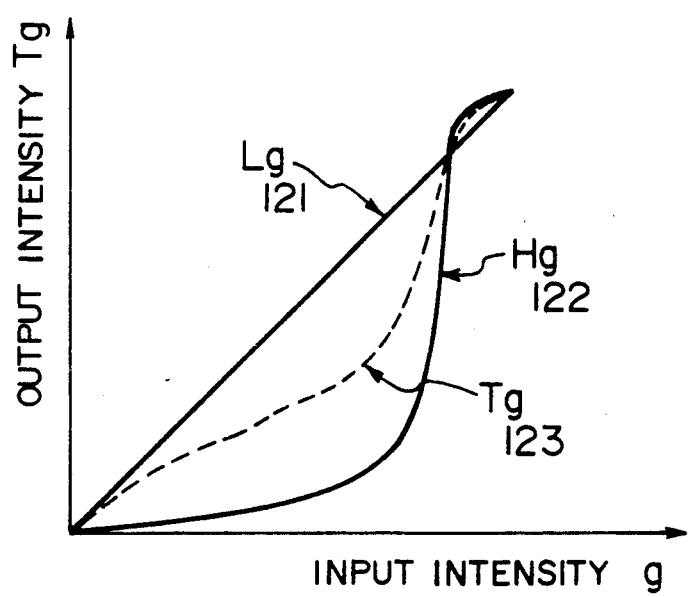
FIGS. 12A and 12B illustrate how to constrain the intensity transformation characteristic in a fifth embodiment of the present invention.
Figure 12B:
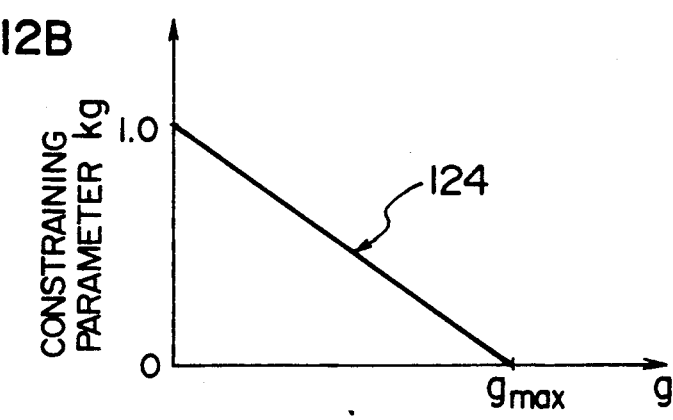

FIGS. 12A and 12B illustrate how the intensity transformation characteristic is constrained in the fifth embodiment of the present invention.

In FIG. 12A, the reference numerals 121, 122 and 123 designate a reference characteristic curve Lg, an equalized characteristic curve Hg and a constrained characteristic curve Tg, respectively.

In this fifth embodiment, a constraining parameter Kg is changed according to an input intensity g as shown by a line 124 in FIG. 12B. When the constraining parameter Kg is changed as shown by the line 124 in FIG. 12B, the constrained characteristic curve Tg 123 approaches the reference characteristic curve Lg 121 in a low intensity portion of an input image and approaches the equalized characteristic curve Hg 122 in a high intensity portion of the input image as shown by the dotted curve in FIG. 12A. On the other hand, when the inclination of the constraining parameter curve Kg 124 is inversed, the constrained characteristic curve Tg 123 is also inversed.

It will be understood from the foregoing detailed description that, according to the automated gray level transformation system of the present invention, an observed image can be substantially freed from an adverse effect of its background by a simple method, and its contrast shortage and overemphasis can also be constrained.

Therefore, automated gray level transformation of such an image with a high image quality can be achieved, so that an image display in the PACS—Picture Achieving and Communication System—(the medical image control system) used in the medical field can be efficiently attained.

Further, because of a short period of time required for the processing, the interactive processing can be achieved with a relatively inexpensive apparatus to which the system of the present invention is applied.

We claim:

1. An automated gray level transformation system for an image processing system including image input means for inputting images, image processing means for processing inputted images and image output means for outputting result of processing by said image processing means, said system comprising, as part of said image processing means, means for continuously constraining an intensity transformation function, which is calculated from a cumulative intensity histogram for each input image, on the basis of the distance between said intensity tranformation function and a pre-selected reference intensity transformation function, further comprising means for suppressing an adverse effect of a background region other than an objective region of an input image during computation of said cumulative intensity histogram.

2. An automated gray level transformation system according to claim 1, wherein said adverse effect of said background region is suppressed by employing, during computation of said cumulative intensity histogram, a weight montonously outwardly decreasing from the central part of said input image.

3. An automated gray level transformation system according to claim 1, wherein said adverse effect of said background region is suppressed by employing, during computation of said cumulative intensity histogram, a weight corresponding to the intensity of said input image.

4. An automated gray level transformation system according to claim 1, wherein said adverse effect of said background region is suppressed by extracting a contour showing an abrupt change in intensity of said input image and removing data in the region outside of said contour.

5. An automated gray level transformation system according to claim 1, further comprising means for modifying, after minimization of said adverse effect of said background region and constraining of said intensity transformation function, a bias value which is selected to be large in a low intensity portion and small in a high intensity portion of said input image according to a characteristic curve of said constrained intensity transformation function.

6. An automated gray level transformation system according to claim 5, wherein said bias value can be modified in an interactive mode by a man-machine interface.

7. An automated gray level transformation system for an image processing system including image input means for inputting images, image processing means for processing inputted images and image output means for outputting a result of processing by said image processing means, said system comprising means for equalizing a histogram of image data applied as an input from said image input means, means for constraining an intensity transformation function obtained as a result of the equalization of said histogram of the image data, and means for suppressing an adverse effect of a background region of an inputted image before histogram equalization by said histogram equalizing means, wherein said means for suppressing said adverse effect of said background region provides a weight corresponding to the distance from the central part of said inputted image.

8. An automated gray level transformation system for an image processing system including image input means for inputting images, image processing means for processing inputted images and image output means for outputting a result of processing by said image processing means, said system comprising means for equalizing a histogram of image data applied as an input from said image input means, means for constraining an intensity transformation function obtained as a result of the equalization of said histogram of the image data, and means for suppressing an adverse effect of a background region of an inputted image before histogram equalization by said histogram equalizing means, wherein said means for suppressing said adverse effect of said background region provides a weight corresponding to the intensity of said inputted image.

9. An automated gray level transformation system for an image processing system including image input means for inputting images, image processing means for processing inputted images and image output means for outputting a result of processing by said image processing means, said system comprising means for equalizing a histogram of image data applied as an input from said image input means, means for constraining an intensity transformation function obtained as a result of the equalization of said histogram of the image data, and means for suppressing an adverse effect of a background region of an inputted image before histogram equalization by said histogram equalizing means, wherein said means for suppressing said adverse effect of said background region provides a weight corresponding to the contour of an objective region in said inputted image.

10. An automated gray level transformation system for an image processing system including image input means for inputting images, image processing means for processing inputted images and image output means for outputting a result of processing by said image processing means, said system comprising means for equalizing a histogram of image data applied as an input from said image input means, means for constraining an intensity transformation function obtained as a result of the equalization of said histogram of the image data, and means for suppressing an adverse effect of a background region of an inputted image before histogram equalization by said histogram equalizing means, wherein said means for suppressing said adverse effect of said background region includes means for providing a weight corresponding to the distance from the central part of said inputted image and means for providing a weight corresponding to the intensity of said inputted image.

11. An automated gray level transformation system for an image processing system including image input means for inputting images, image processing means for processing inputted images and image output means for outputting a result of processing by said image processing means, said system comprising means for equalizing a histogram of image data applied as an input from said image input means, means for constraining an intensity transformation function obtained as a result of the equalization of said histogram of the image data, and means for suppressing an adverse effect of a background region of an inputted image before histogram equalization by said histogram equalizing means, wherein said means for suppressing said adverse effect of said background region includes means for providing a weight corresponding to the contour of distance from the central part of said inputted image and means for providing a weight corresponding to the contour of an objective region in said inputted image.

12. An automated gray level transformation system for an image processing system including image input means for inputting images, image processing means for processing inputted images and image output means for outputting a result of processing by said image processing means, said system comprising means for equalizing a histogram of image data applied as an input from said image input means, means for constraining an intensity transformation function obtained as a result of the equalization of said histogram of the image data, and means for suppressing an adverse effect of a background region of an inputted image before histogram equalization by said histogram equalizing means, wherein said means for suppressing said adverse effect of said background region includes means for providing a weight corresponding to the intensity of said inputted image and means for providing a weight corresponding to the contour of an objective region in said inputted image.

* * * * *